2,968,674
Patented Jan. 17, 1961

2,968,674

PROCESS FOR HYDROLYZING DIBASIC ACID ESTERS WHILE INHIBITING THE FORMATION OF COLOR MATERIALS

Norman W. Franke, Penn Township, Allegheny County, Pa., and Edgar I. Crowley, Baltimore, Md., assignors to Gulf Research & Development Company, Pittsburgh, Pa., a corporation of Delaware No Drawing. Filed Sept. 25, 1957, Ser. No. 686,042

4 Claims. (Cl. 260—533)

This invention relates to a method of preparing acids and more particularly to a method of hydrolyzing esters to produce acids while inhibiting the formation of color materials.

The process of hydrolyzing esters to obtain organic acids is obviously old and well known. Unfortunately in such hydrolysis processes the formation of the organic acids is often accompanied by the formation of color materials which must be removed from the desirable acids in order to render the same commercially acceptable. Such purification of course adds greatly to the processing costs and in many cases results in loss of acids because of decomposition or degradation products formed under the reaction conditions employed in the purification stage.

We have found that organic acids can be obtained and the formation of color materials can be inhibited by a process which comprises hydrolyzing an ester in an inert atmosphere. Examples of inert materials which can be used are carbon dioxide, nitrogen and helium. Best results are obtained with carbon dioxide.

While any organic ester can be hydrolyzed in accordance with the process of this invention to obtain an organic acid while inhibiting the formation of color materials, the process is particularly effective in hydrolyzing dibasic acid esters which have been prepared using dibasic acids obtained by the nitric acid oxidation of hydrocarbons. In general, such dibasic acids are prepared by oxidizing hydrocarbons, aliphatic, naphthenic or aromatic, or air-oxidized derivatives thereof, with nitric acid having a concentration of about 10 to about 100 percent, preferably about 50 to about 95 percent, at a temperature of about 50° to about 150° C., preferably about 75° to about 130° C., and a pressure of about atmospheric to about 1500 pounds per square inch, preferably about 100 to about 1000 pounds per square inch, for about 5 minutes to about 60 hours, preferably about 15 minutes to about two hours. The product obtained can then be treated, for example, by distillation at a temperature of about 30° to about 75° C. and a pressure of about 5 to about 10 millimeters of mercury, to remove nitric acid therefrom and obtain a product predominating in dibasic acids having 3 to 12 carbon atoms.

This process is most particularly effective in hydrolyzing dibasic acid esters prepared with dibasic acids obtained in accordance with the process disclosed and claimed in U.S. Patent No. 2,771,482, dated November 20, 1956, to George P. Brown, Jr., Edgar I. Crowley and Norman W. Franke and assigned to the assignee of this invention. Briefly, in the process of the patent a saturated aliphatic hydrocarbon is initially subjected to oxidation with air or other oxygen-containing gas, i.e., a gas containing free oxygen, for a time sufficient to obtain a product having a saponification number above about 100, and preferably between about 150 and 450, and the product obtained is thereafter subjected to further oxidation at an elevated temperature with nitric acid having a concentration above about 50, and preferably above about 60 percent, for a time sufficient to obtain substantial amounts of dibasic acids having 3 to 12 carbon atoms, such as succinic, glutaric, adipic, etc.

Alcohols which are employed in preparing the dibasic acid esters, monoesters as well as diesters, which are hydrolyzed in accordance with the process of this invention are aliphatic monohydric alcohols containing about one to about 20 carbon atoms per molecule, preferably about one to about 15 carbon atoms per molecule. For example, methyl, ethyl, propyl, butyl, amyl, hexyl, octyl, decyl, dodecyl, tridecyl, and pentadecyl normal or branched chain alcohols can be used. Especially suitable alchols for use in esterifying the dibasic acids are the methyl, ethyl and branched-chain $C_5$ to $C_8$ alcohols, e.g., amyl and octyl alcohols, prepared according to the Oxo synthesis process, which involves catalytic hydroformylation of olefins, such as hexene, heptene, etc., with hydrogen and carbon monoxide to obtain a product predominating in an aldehyde having one more carbon atom than the olefin in the charge, followed by catalytic hydrogenation of the product obtained to convert the aldehyde to the corresponding alcohol.

The conditions under which the esters which are to be hydrolyzed in accordance with the present invention are prepared are conventional and need not be described in great detail. Thus, the esterification is satisfactorily carried out by refluxing the dibasic acid, with an excess of the monohydric alcohol, for example, a 3:1 mol ratio of alcohol to acid, preferably in the presence of a small amount of a suitable catalyst, e.g., sulfuric acid, dry hydrogen chloride, paratoluene sulfonic acid, or the like, for a period of about 3 to about 10 hours, for example, 5 hours. The time of reaction normally decreases with increased temperature of the reaction mixture. Although esterification can proceed to some degree at temperatures as low as room temperature, elevated temperatures of the order of about 60° to about 250° C. are preferably employed. When temperatures exceeding the boiling point of water are used, and the alcohol employed is not completely miscible with water, water of esterification can be trapped off, thus tending to drive the esterification reaction to completion. Examples of dibasic acid esters which can be hydrolyzed in accordance with the present process are dimethyl succinate, dimethyl adipate, dioctyl adipate, etc. The acids, particularly the dibasic acids, produced can be used for the manufacture of plastics, plasticizers, etc.

The esters, particularly the dibasic acid esters, hydrolyzed in accordance with the present process to obtain the desired acids can be esters obtainable commercially or otherwise as such or as an intermediate in a process for recovering acids separately from a mixture of acids. For example, in the aforementioned U.S. Patent No. 2,771,482, mixtures of dibasic acids are recovered. These mixtures are difficult to separate by conventional means, for example, sublimation, distillation and the like. However, the mixture of acids can be separated by esterifying the mixture with one or more alcohols, thereby producing mixed esters which for the most part boil at sufficiently different temperatures to permit a ready separation. The esters can then be recovered individually and hydrolyzed to obtain the corresponding acids.

The temperatures and pressures employed in carrying out the present process are not critical and can be varied over a wide range. Thus a temperature of about 120° to about 500° F., preferably about 150° to about 400° F., and a pressure of about 0 to about 1000 pounds per square inch, preferably about 0 to about 500 pounds per square inch, can be used.

In carrying out the hydrolysis reaction it is necessary either to provide for removal of one of the reaction products, or to provide one of the reactants in great excess.

This is necessary, of course, to drive the reaction beyond the equilibrium reached when only equimolar amounts of ester and water are charged to the reactor. When one of the products is volatile under the conditions of the reaction, the first procedure is preferred. In any event, the amount of water relative to ester which can be used, on a molar basis is at least 1:1. Since water is cheap, water is generally preferred is excess when such procedure is employed.

The present hydrolysis reaction can be carried out with either acids or bases as catalyst. Examples of substances which can be used include sulfuric acid, p-toluene sulfonic acid, calcium hydroxide, etc. The amount of catalyst used is not critical and can be at least about 0.01 and preferably about 0.05 to about 5.0 percent by weight.

Carrying out the hydrolysis reaction as described thus far will result not only in the production of the desired acid but at the same time in the additional production of color materials which were not observed as being present in the ester before hydrolysis. The formation of color bodies during the hydrolysis can be inhibited in accordance with the process of this invention by maintaining an atmosphere of inert material upon the reactants during the hydrolysis reaction. This can be done, for example, by bubbling carbon dioxide through the reaction mixture or by passing carbon dioxide or other inert material over the reactants. While the desired results will be obtained as long as the atmosphere on the reactants is essentially inert material, we have found that the amount of inert material relative to the reactants should be about equal to the free space in the reactor above the liquid phase. For example, in a one-liter reactor containing 500 cc. of liquid reactant the amount of inert gas should always be about 500 cc. By filling the free space in the reactor, air is excluded and oxygen is thereby prevented from darkening the products. To insure a blanket of inert material, the inert material is generally constantly replenished. Thus when carbon dioxide is used, a small stream of gaseous carbon dioxide amounting to one to 25 percent of the volume of the free space is bubbled through the reaction mixture each minute.

Why the present procedure is effective in inhibiting the formation of color bodies during hydrolysis we are not certain, although we believe that the phenomenon can be explained on the basis that the presence of inert material excludes the presence of oxygen which could react with one of the reactants to form the color bodies.

The invention can be further illustrated in the following examples.

Example I

Into a flask equipped with baffles and a large paddle stirrer, a take-off condenser and a vapor temperature thermometer, was placed 101.0 grams of dimethyl adipate, 505.4 grams of water, and one cc. of concentrated nitric acid. The mixture was heated at atmospheric pressure to a temperature of 79° C. over a period of 65 minutes, at which time refluxing began. Heating was continued for 25 minutes until the vapor temperature reached 76° C. and methyl alcohol began to come off overhead. The mixture was heated for an additional 3½ hours at 79° to 99° C. (overhead temperature) until all of the methyl alcohol produced was removed overhead. 86.6 grams of adipic acid having a yellow tan color was obtained.

Example II

The run above was repeated with 100.0 grams of dimethyl adipate, 303.2 grams of water and one cc. of nitric acid. For one-half hour before heating the reaction mixture was swept with carbon dioxide and during the reaction carbon dioxide was bubbled therethrough at a rate of 0.1 liter per minute. 83.5 grams of adipic acid was obtained having a water-white color, except a small amount of color behind the baffles which was believed caused by the formation of hot spots in the quiescent space behind the baffles.

Comparison of the two runs described above, which were similar except that in the latter instance the hydrolysis was carried out in an atmosphere of carbon dioxide, shows the advantages of operating in accordance with the process of the present invention. With no carbon dioxide present the dibasic acid obtained was highly colored and would be of little value commercially without further processing. Operation in an atmosphere of carbon dioxide resulted in a product of little or no color, which would be attractive commercially without further treatment.

Example III

Into a stirred one-liter, stainless autoclave was placed 101.4 grams of dimethyl adipate, 200 grams of water and 0.5 gram of nitric acid. The autoclave was closed, pressured to 10 pounds per square inch with nitrogen and heated for one hour at 125° C., after which 97 grams of alcohol and water were distilled out. The alcohol in the distillate indicated that the reaction was 83 percent complete. 97 grams of water were added to the mixture and the resulting mixture was heated at 125° C. for another hour. The autoclave was then opened and the contents were removed. A yield of 98.5 percent (83.9 grams) of clean white adipic acid was obtained.

Obviously, many modifications and variations of the invention, as hereinabove set forth, can be made without departing from the spirit and scope thereof, and only such limitations should be imposed as are indicated in the appended claims.

We claim:

1. In a process wherein a saturated aliphatic hydrocarbon is oxidized with a gas containing free oxygen to obtain a product having a saponification number from about 100 to 450 and said product is thereafter subjected to further oxidation at an elevated temperature with nitric acid having a concentration above about 50 percent to obtain dibasic acids having 3 to 12 carbon atoms, said dibasic acids are reacted with an aliphatic monohydric alcohol having one to 20 carbon atoms to obtain the corresponding esters and said esters are thereafter hydrolyzed to obtain the corresponding dibasic acids, said hydrolysis being accompanied by the formation of undesirable color materials, the improvement which comprises conducting said hydrolysis in an inert atmosphere, whereby the formation of said undesirable color materials is inhibited.

2. The process of claim 1 wherein said inert atmosphere is an atmosphere of carbon dioxide.

3. The process of claim 1 wherein the ester of adipic acid is separated from the mixture obtained as a result of the reaction between said dibasic acids and said aliphatic monohydric alcohol and said ester of adipic acid is subjected to said hydrolysis in said inert atmosphere.

4. The process of claim 1 wherein the ester of adipic acid is separated from the mixture obtained as a result of the reaction between said dibasic acids and said aliphatic monohydric alcohol and said ester of adipic acid is subjected to hydrolysis and the inert atmosphere is an atmosphere of carbon dioxide.

References Cited in the file of this patent

UNITED STATES PATENTS

| | | |
|---|---|---|
| 1,931,859 | Beller et al. | Oct. 24, 1933 |
| 2,839,571 | Johnston et al. | June 17, 1958 |

OTHER REFERENCES

Morton: "Laboratory Technique in Organic Chemistry," 1938, pages 217–218.

Wendler et al.: J. Am. Chem. Soc., 73, 723–724 (1951).

Stallberg-Stenhagen: Chem. Abs., vol. 46, 1952, page 3948.

Mitchell, Jr., et al.: "Organic Analysis," vol. II. 1954, pages 29–30.